(12) United States Patent
Sewell

(10) Patent No.: US 10,954,718 B2
(45) Date of Patent: Mar. 23, 2021

(54) TRANSMISSION DEVICE

(71) Applicant: SEWELL POWER TRANSFER PTY LTD, Southport (AU)

(72) Inventor: Samuel John Sewell, Southport (AU)

(73) Assignee: SEWELL POWER TRANSFER PTY LTD, Southport (AU)

( * ) Notice: Subject to any disclaimer, the term of this patent is extended or adjusted under 35 U.S.C. 154(b) by 0 days.

(21) Appl. No.: 16/336,860

(22) PCT Filed: Sep. 28, 2017

(86) PCT No.: PCT/AU2017/051060
§ 371 (c)(1),
(2) Date: Mar. 26, 2019

(87) PCT Pub. No.: WO2018/058188
PCT Pub. Date: Apr. 5, 2018

(65) Prior Publication Data
US 2019/0226281 A1    Jul. 25, 2019

(30) Foreign Application Priority Data

Sep. 28, 2016 (AU) .............................. 2016903933

(51) Int. Cl.
*F16H 3/44* (2006.01)
*E21B 4/00* (2006.01)
(Continued)

(52) U.S. Cl.
CPC ............... *E21B 4/006* (2013.01); *F16H 3/44* (2013.01); *F16H 3/54* (2013.01); *F16H 59/14* (2013.01);
(Continued)

(58) Field of Classification Search
CPC ... F16H 3/44; F16H 3/54; F16H 59/14; F16H 59/26; F16H 61/30; F16H 63/30;
(Continued)

(56) References Cited

U.S. PATENT DOCUMENTS 3,610,343 A    10/1971  Bratt
4,549,449 A    10/1985  Miller et al.
(Continued)

OTHER PUBLICATIONS

International Search Report from the corresponding International Patent Application No. PCT/AU2017/051060, dated Jan. 22, 2018.

*Primary Examiner* — Leslie A Nicholson, III
(74) *Attorney, Agent, or Firm* — Greer, Burns & Crain, Ltd.

(57) ABSTRACT

A transmission device including a body, an input member extending along the body, and having a rotational axis, a gear assembly connected to the input member, having an inner gear, one or more intermediate gears engaged with the inner gear; and an outer gear engaged with one or more intermediate gears, wherein in a first position the gear assembly is configured to rotate at substantially the same rate as the input member and axial movement of at least one component to a second position, in a direction substantially parallel to the axis of rotation, allows the gear assembly to provide to an output member a different output rate relative to the input member, and an actuator movable between a first position at which the gear assembly moves to its first position and a second position at which the gear assembly moves to its second position, the actuator moves under hydraulic pressure.

45 Claims, 11 Drawing Sheets

(51) Int. Cl.
  *F16H 3/54*   (2006.01)
  *F16H 61/30*  (2006.01)
  *F16H 63/30*  (2006.01)
  *F16H 59/14*  (2006.01)
  *F16H 59/26*  (2006.01)

(52) U.S. Cl.
  CPC .............. *F16H 59/26* (2013.01); *F16H 61/30* (2013.01); *F16H 63/30* (2013.01); *F16H 63/3023* (2013.01); *F16H 2061/307* (2013.01); *F16H 2200/0034* (2013.01)

(58) Field of Classification Search
  CPC ......... F16H 63/3023; F16H 2200/0034; F16H 2061/307; E21B 4/00; E21B 4/006
  USPC ........................................................ 475/116
  See application file for complete search history.

(56) References Cited

U.S. PATENT DOCUMENTS

| | | | |
|---|---|---|---|
| 5,006,100 A | 4/1991 | Brandt et al. | |
| 5,954,144 A * | 9/1999 | Thames | B25B 21/008 |
| | | | 173/216 |
| 8,951,156 B2 * | 2/2015 | Klemm | F16H 63/3023 |
| | | | 475/138 |
| 10,557,537 B2 * | 2/2020 | Keeney | F16H 48/08 |

* cited by examiner

TRANSMISSION DEVICE

BACKGROUND

The invention relates to a transmission device. In particular, the invention relates, but is not limited, to a transmission device for drilling earthen material.

Reference to background art herein is not to be construed as an admission that such art constitutes common general knowledge in Australia or elsewhere.

The drilling of earthen material may take a variety of forms. Rotary earth drilling typically involves, amongst other things, using an attachment (or bit) to drill a hole in the ground. A similar process, normally in the construction industry, also involves winding piles (e.g. poles) into the ground much like a screw into wood. Commonly, a single speed transmission is used in rotatory earth drilling and/or screw piling.

A compromise between torque and speed is a typical problem associated with transmissions and, in particular, single speed transmissions in rotatory earth drilling and/or screw piling. That is, as a torque requirement is increased, the speed of drilling is required to be reduced in a single speed transmission. In practice, this typically results in a single speed transmission being geared for maximum torque to overcome the most difficult stages of drilling and/or piling. This maximum torque results in a lower speed which may waste operator time where a lower torque/higher speed drilling job is required.

There have been attempts to improve on the compromise between torque and speed in single speed transmissions for rotatory earth drilling and/or screw piling. For example, variable speed hydraulic pump motors have been included on auger drilling assemblies to provide different speeds and torque. However, this approach is limited by the hydraulic pressure in the system, the characteristics of hydraulic motors and fails to take advantage of the variations possible using a mechanical transmission with a number of gears. Furthermore, optimal pump settings are typically based on torque of the drilling attachment and not the pressure in the system. This may lead to lag in the system.

Other transmissions have also been proposed for the drilling of earthen material but these transmissions are typically complex and expensive. Furthermore, technology relating to vehicle transmissions also appears unsuitable for drilling earthen material given the large drilling forces associated therewith.

It is an aim of this invention to provide a transmission device which overcomes or ameliorates one or more of the disadvantages or problems described above, or which at least provides a useful alternative.

Other preferred objects of the present invention will become apparent from the following description.

SUMMARY

In one form, although not necessarily the only or broadest form, the invention resides in a transmission device comprising:
a body assisting to support components including:
an input member extending at least part way along the body, the input member having an axis of rotation;
a gear assembly that is connected to the input member, the gear assembly having:
an inner gear;
one or more intermediate gears engaged with the inner gear; and
an outer gear engaged with the one or more intermediate gears,
wherein in a first position the gear assembly is configured with the input member to rotate at substantially the same rate as the input member and axial movement of at least one component to a second position, in a direction substantially parallel to the axis of rotation, allows the gear assembly to provide to an output member a different output rate relative to the input member, and
an actuator movable between a first position at which the gear assembly can move to its first position and a second position at which the gear assembly can move to its second position, said actuator being movable under the influence of hydraulic pressure.

In one embodiment, the actuator has a cylindrical portion. In one embodiment, the actuator surrounds the gear assembly.

Preferably, the body includes one or more fluid ports. Preferably, the body includes one or more fluid channels. Preferably, the one or more fluid ports include an inlet port and an outlet port.

In one embodiment, the actuator includes a projection that extends into a fluid channel that is in fluid communication with a first fluid port and a second fluid port. When pressurised fluid is provided to one of the fluid ports, the actuator moves to the first position and when pressurised fluid is provided to the other of the fluid ports, the actuator moves to the second position. In one embodiment, the actuator comprises a cylindrical region having a projection extending substantially around the periphery of the cylindrical region, and the fluid channel comprises an annular fluid channel. The projection may form a seal with a wall of the fluid channel. A seal, such as an O-ring or other suitable sealing means, may be provided in the wall of the fluid channel to assist in forming the seal.

Preferably, the body is in the form of a housing that houses the input member and the gear assembly.

Preferably, the body is configured to support a further input member, a further gear assembly and a further output member.

Preferably, the body is configured to be connected to a further transmission.

Preferably, the body includes a longitudinal axis. Preferably, the longitudinal axis is substantially parallel with the axis of rotation.

Preferably, the input member is configured to be connected to the inner gear.

Preferably, the input member is configured to be connected to an input shaft. Preferably, the input member includes the input shaft.

Preferably, the input shaft assists in maintaining the input member in substantially one location.

Preferably, the input member includes an engagement portion. Preferably, the engagement portion is configured to engage with the gear assembly to allow the gear assembly to rotate at substantially the same rate as the input member.

Preferably, the engagement portion includes one or more bearing faces that engage with the gear assembly to provide rotation thereto.

Preferably, the one or more bearing faces form at least one tooth. Preferably, the input member includes a plurality of bearing faces in the form of teeth therearound.

Preferably, the gear assembly includes a selecting member. Preferably, the selecting member includes one or more releasable contacting portions.

Preferably, in response to the one or more releasable contacting portions being engaged in the first position, the gear assembly is configured to rotate with the input member at substantially the same rate as the input member.

Preferably, the one or more releasable contacting portions are engaged with the engagement portion of the input member in the first position.

Preferably, the one or more releasable contacting portions include one or more contacting faces. Preferably, the one or more contacting faces are configured to engage the one or more bearing faces.

Preferably, the one or more contacting faces form at least one tooth. Preferably, the selecting member includes a plurality of contacting faces in the form of teeth therearound.

Preferably, the selecting member is fixed to the outer gear.

Preferably, the input member extends at least part way through selecting member.

Preferably, the input member is rotatably connected to the selecting member.

Preferably, the components further include an actuation member. Preferably, the actuation member is located between the body and the selecting member. Preferably, the actuation member is substantially cylindrical.

Preferably, the actuation member is configured to engage the selecting member in order to assist in moving the selecting member.

Preferably, the actuation member is in fluid communication with the one or more fluid ports. Preferably, in response to fluid being directed through the one or more fluid ports in a first direction, the actuation member is located in the first position.

Preferably, in response to fluid being directed through the one or more fluid ports in a second direction, the actuation member moves in a direction substantially parallel to the axis of rotation to the second position.

Preferably, the direction of the fluid is determined by a fluid pressure in the fluid system.

Preferably, in response to the fluid pressure being on side of a predetermined value, the fluid is directed in the first direction. Preferably, in response to the fluid pressure being on another side of the predetermined value, the fluid is directed in the second direction.

Preferably, the fluid is in the form of hydraulic fluid. Preferably, the hydraulic fluid is supplied from a motor. Preferably, the motor drives the input member. Preferably, the motor includes at least two speeds. Preferably, the at least two speeds are predetermined set speeds. Preferably, the at least two speeds are above zero.

Preferably, as the actuation member moves in a direction substantially parallel to the axis of rotation to the second position, the actuation member moves the selecting member to the second position. Preferably, the selecting member moves substantially parallel to the axis of rotation to the second position.

Preferably, the selecting member is rotatably connected to the actuation member.

Preferably, the inner gear is in the form of a sun gear. Preferably, the inner gear includes a shaft that connects to the input member. Preferably, the inner gear is a spur gear.

Preferably, the one or more intermediate gears are in the form of a planetary gear. Preferably, the one or more intermediate gears include at least two intermediate gears. Preferably, the one or more intermediate gears include three intermediate gears. Preferably, the one or more intermediate gears are in the form of spur gears.

Preferably, the input rate to output rate is greater than about 3.4:1. Preferably, the input rate to output rate is greater than about 3.48:1.

Preferably, the input rate to a further output rate is greater than about 12:1. Preferably, the input rate to a further output rate is greater than about 42:1. Preferably, the input rate to a further output rate is greater than about 146:1.

Preferably, the one or more intermediate gears are connected with a carrier member. Preferably, the carrier member extends through the one or more intermediate gears.

Preferably, the output member is connected to the carrier member. Preferably, the output member is configured to connect to the further input member that is connected to the further gear assembly.

Preferably, the outer gear is a ring gear. Preferably, the outer gear includes an inner face having teeth to form the gear. Preferably, the teeth of the inner face engage with the intermediate teeth.

Preferably, the outer gear includes an outer surface that is fixed to the selecting member.

Preferably, the transmission device is an earthen material drilling transmission.

In one embodiment, the transmission device is driven by a hydraulic motor, the hydraulic motor being driven by a supply of pressurised hydraulic fluid. The transmission device may further comprise a first fluid port and a second fluid port being in fluid communication with a fluid channel in the body, the actuator having a portion extending into the fluid channel, whereby when pressurised hydraulic fluid is provided to one of the first fluid port or the second fluid port, the actuator moves to the first position and when pressurised hydraulic fluid is provided to the other of the first fluid port or the second fluid port, the actuator moves to the second position. In this embodiment, the pressurised hydraulic fluid that is supplied to the first fluid port or the second fluid port may be provided from the supply of hydraulic fluid that is used to drive the hydraulic motor.

In some embodiments, the hydraulic circuit may be designed to maintain the minimum pressure required to actuate a gear change by restricting the flow of hydraulic fluid until full pressure is restored. In this way, the hydraulic circuit can allow for any low-pressure events, such as when the auger has not yet started drilling, or between gear changes, without unduly affecting operation of the motor. In this manner, hydraulic pressure from the auger drive motor can be used to actuate the gear changes.

The transmission device may further include a control system. The control system may comprise at least one sensor for sensing hydraulic pressure in an hydraulic motor, the control system determining if hydraulic pressure is increasing and, if the control system determines that the rate of increase of the hydraulic pressure has slowed to below a predetermined value or to zero, the control system determining or recording a pressure value at which the rate of increase of the hydraulic pressure slowed to below the predetermined value or to zero, the control system then calculating a gear change hydraulic pressure from the determined or recorded pressure value, the gear change hydraulic pressure representing a pressure at which the control system sends a signal to cause the transmission device to change from a higher output speed to a lower output speed.

In this embodiment, the control system operates such that when the transmission device is first used for a particular day or first used after start-up of the transmission device, the control system determines when the transmission device is about to stall. This will typically occur when the pressure of the hydraulic fluid supplied to the hydraulic motor, or the differential pressure of hydraulic fluid in the hydraulic motor, reaches a value at which a pressure relief valve operates. The control system determines this by determining the rate of change of hydraulic pressure in the motor. As the motor approaches its stall loading, the rate of change of hydraulic pressure decreases. Thus, the control system effectively "learns" how the transmission device is configured for use for that day and is able to determine the likely stall pressure of the transmission device. The control system then calculates a gear change hydraulic pressure, which will typically be a hydraulic pressure that is slightly below the determined hydraulic pressure at which the motor is likely to stall. When the transmission device is operating at its higher output speed, if the pressure sensor(s) detect that the hydraulic pressure in the motor reaches the gear change hydraulic pressure, the control signal sends a signal to cause the transmission device to change from its high output speed to its lower output speed.

In one embodiment, the control system further includes one or more valves for controlling flow of hydraulic fluid to the first port and to the second port. When the gear assembly is in the first position (which is typically the high output speed position), and the control system determines that the gear change hydraulic pressure has been reached, the control system sends a control signal to the one or more valves such that hydraulic fluid supply changes from the first fluid port to the second fluid ports so that the actuator moves to the second position at which the output speed is typically lower than the input speed.

The one or more valves may comprise one or more solenoids.

When determining the gear change hydraulic pressure, the control system will also be provided with a minimum pressure value at which the gear change hydraulic pressure should be set and a maximum pressure value at which the gear change hydraulic pressure should be set. If the determined gear change hydraulic pressure falls below the minimum pressure value, the control system will set the gear change hydraulic pressure to the minimum pressure value and if the determined gear change hydraulic pressure falls above the maximum pressure value, the control system will set the gear change hydraulic pressure to the maximum value. This assists in setting the gear change hydraulic pressure to a sensible value in instances where operation of the transmission device represents an abnormal operating condition.

In order to change the transmission device from a lower output speed to a higher output speed, the control system may also have a minimum operating hydraulic pressure. If the pressure that is sensed in the hydraulic motor is less than the minimum operating hydraulic pressure, the control system will send a control signal to change the transmission from the low speed output to high speed output.

The control system of preferred embodiments of the present invention does not require that a pre-set gear change hydraulic pressure be loaded into the control system. Rather, the control system determines what the gear change hydraulic pressure should be from operation of the transmission device after the first turn-on or start up of the control system and the sensed hydraulic pressures in the motor driving the transmission device. This provides significant benefits over control systems that only have a single, pre-set value for the gear change pressure.

The control system may be used in gearbox and motor combination is that are used to drive augers. The control system may be used with gearboxes or transmissions that include two or more speeds due to gearing, or in motor and gearbox combinations that have a single gearbox speed but a multispeed motor.

Accordingly, in a second aspect, the present invention provides a control system for use with a hydraulic motor and gearbox/transmission arrangement for driving an auger, the control system comprising at least one sensor for sensing hydraulic pressure in an hydraulic motor, the control system determining if hydraulic pressure is increasing and, if the control system determines that the rate of increase of the hydraulic pressure has slowed to below a predetermined value or to zero, the control system determining or recording a pressure value at which the rate of increase of the hydraulic pressure slowed to below the predetermined value or to zero, the control system then calculating a gear change or speed change hydraulic pressure from the determined or recorded pressure value, the gear change or speed change hydraulic pressure representing a pressure at which the control system sends a signal to cause the transmission device to change from a higher output speed to a lower output speed or to cause a motor to change from a higher speed to a lower speed.

Other features of the control system of the second aspect of the present invention may be as described above.

As mentioned above, the control system of the second aspect of the present invention may be used with motor and gearbox/transmission arrangements in which the gearbox is transmission has two or more speeds due to gearing assemblies, or the control system may be used with motor and gearbox/transmission arrangement in which the gearbox/transmission has a single speed but the motor can be operated at two or more different speeds.

In some embodiments, the control system includes a memory system on which control instructions are written. The control system receives pressure signals from the one or more pressure sensors. The control system may also include control signal output means for sending control signals to control operation of the gearbox or transmission and/or the motor.

In another form the invention resides in a drilling system, the system including:
a motor providing hydraulic fluid to a transmission device, the transmission device comprising:
a body assisting to support components including:
an input member extending at least part way along the body, the input member having an axis of rotation;
a gear assembly that is connected to the input member, the gear assembly having:
an inner gear;
one or more intermediate gears engaged with the inner gear; and
an outer gear engaged with the one or more intermediate gears,
wherein in a first position the gear assembly is configured with the input member to rotate at substantially the same rate as the input member and axial movement of at least one component to a second position, in a direction substantially parallel to the axis of rotation, allows the gear assembly to provide to an output member a different output rate relative to the input member; and wherein the output member is connected to an auger.

In another form the invention resides in a method for power transmission, the method including the steps of:
rotating at least part of a gear assembly at substantially the same rate as an input member, the gear assembly having:
an inner gear;
one or more intermediate gears engaged with the inner gear; and
an outer gear engaged with the one or more intermediate gears, moving at least one component in a transmission device to another position, in a direction substantially parallel to an axis of rotation for the input member, to allow the gear assembly to provide a different output rate relative to the input member.

Preferably, the step of moving the at least one component in the transmission device to another position, in the direction substantially parallel to the axis of rotation for the input member, includes moving an actuation member with a fluid. Preferably, the fluid is hydraulic.

Preferably, the step of moving the actuation member with the fluid includes changing a direction of a fluid flow. Preferably, the step of changing the direction of fluid flow takes place in response to passing a predetermined pressure in a fluid system associated with the fluid.

Preferably, the actuation member is configured to move along a body. Preferably, the actuation member is configured to move along an inner surface of the body. Preferably, the body is in the form of a housing.

Preferably, the actuation member is connected to the gear assembly and/or the input member.

Preferably, in response to moving the actuation member with the fluid, a part of the input member is disengaged from the gear assembly to allow the gear assembly to provide the different output rate relative to the input member.

Preferably, the step of disengaging part of the input member from the gear assembly includes disengaging one or more teeth on the input member from one or more teeth on the gear assembly.

Preferably, the one or more teeth on the gear assembly are included on a selecting member of the gear assembly. Preferably, the selecting member retains the outer gear.

Preferably, the method further includes the step of providing the different output rate to an output member that is connected to a further input member that drives a further gear assembly.

Further features and advantages of the present invention will become apparent from the following detailed description.

BRIEF DESCRIPTION OF THE DRAWINGS

By way of example only, preferred embodiments of the invention will be described more fully hereinafter with reference to the accompanying figures, wherein.

DETAILED DESCRIPTION

Figure 1:
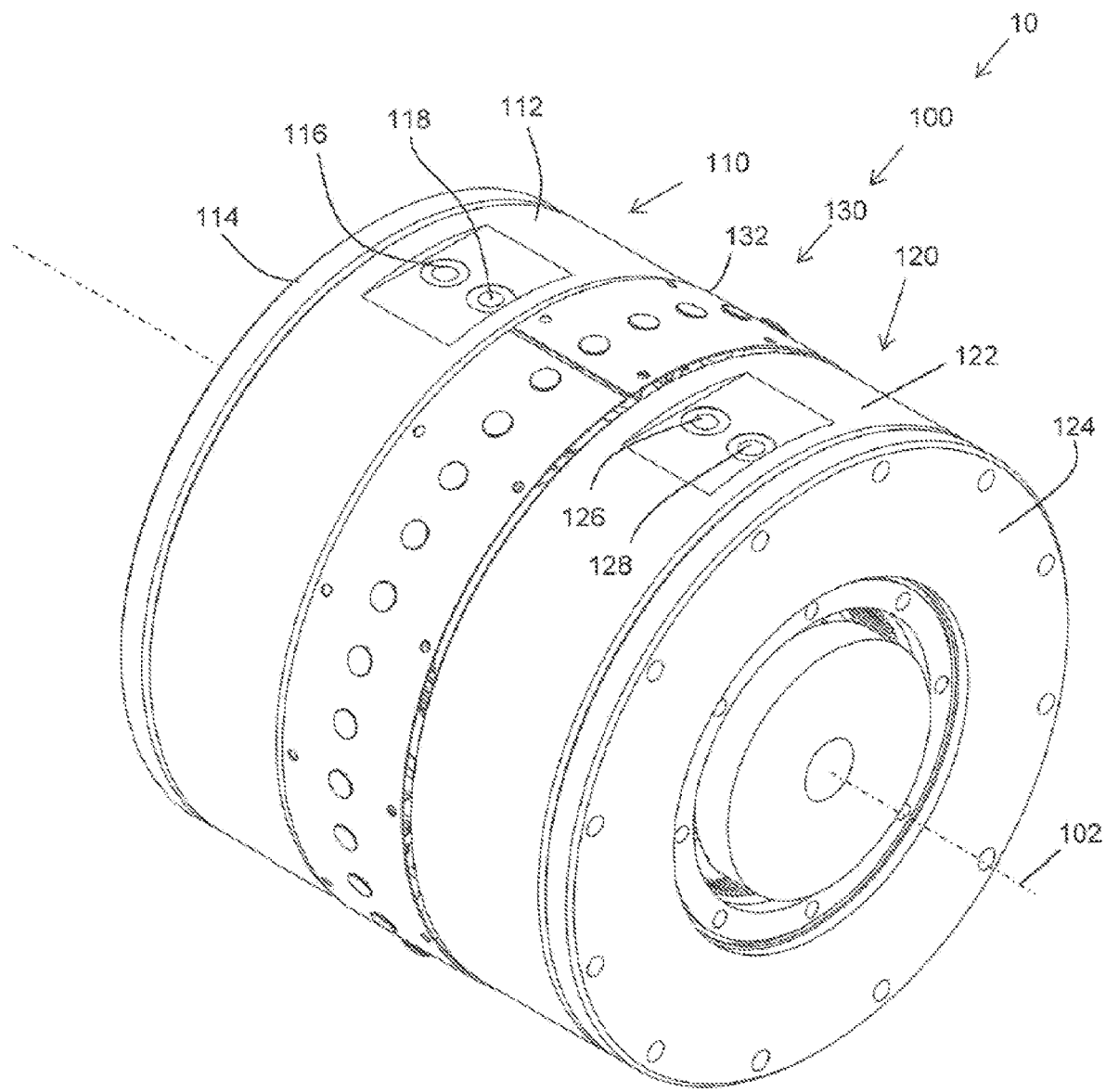
FIG. 1 illustrates a transmission device, according to an embodiment of the invention.

FIGS. 1 to 4 illustrate a transmission device 10, according to an embodiment of the invention. The transmission device 10 includes a body 100, an input member 200a, a gear assembly 300a and an output member (not shown). The input member 200a, gear assembly 300a and output member constitute a first stage (or set) of the transmissions device 10.

As outlined further below, the body 100 directly and/or indirectly supports the input member 200a, gear assembly 300a and output member. The body 100 also encloses the input member 200a, gear assembly 300a and output member in this embodiment. The body 100 is typically made of steel but, in further embodiments, it may comprise aluminium, composites and/or the alike. The body 100 is substantially cylindrical.

The body 100 includes a first portion 110. The first portion 110 comprises a housing 112 and an end plate 114. The housing 112 includes fluid ports in the form of inlet fluid port 116 and outlet fluid port 118. It would be appreciated by a person skilled in the art that depending on the design requirements of the transmission device 10, the inlet fluid port 116 may be an outlet port and outlet fluid port 118 may be an inlet port. The fluid ports 116, 118 communicate with an internal space of the housing 112.

The end plate 114 of the first portion 110 is connected at one end of the housing 112 to assist in enclosing an end thereof. The end plate 114 includes an aperture to receive an input/output member therethrough along the longitudinal axis 102 of the body 100. The end plate 114 is sealingly connected to the housing 112.

The first portion 110 is adjacent to a middle portion 130 of the body 100. The middle portion 130 includes a cover portion 132 and a connecting portion 134. The connecting portion 134 is configured to receive one or more fasteners from the first portion 110. The cover portion 132 covers, amongst other things, the fasteners extending from the end plate 114, through the housing 112, into the middle portion 130. The middle portion 130 may also include the required sensors, valves, hoses and pressure relief valves in this embodiment, but it will be appreciated that these may be integrated in other parts of the body 100 by, for example, having a manifold attached thereto.

The middle portion 130 is also connected to a second portion 120 of the body 100. The second portion 120 is substantially similar to the first portion 110. The second portion 120 comprises a housing 122 and an end plate 114. The housing 122 includes fluid ports in the form of inlet fluid port 126 and outlet fluid port 128.

The end plate 124 of the second portion 120 is connected at one end of the housing 122 to assist in enclosing an end thereof. The end plate 124 includes an aperture to receive an input/output member therethrough along the longitudinal axis 102 of the body 100. The end plate 124 is sealingly connected to the housing 122.

As outlined further below, the second portion 130 of the body 100 is configured to support, either directly or indirectly, a further (or second) input member 200b, gear assembly 300b and output member (not shown). The further input member 200b, gear assembly 300b and output member constitute a second stage (or set) of the transmissions device 10.

The input members 200a, 200b respectively include an aperture 210a, 210b that is configured to receive an input/output shaft (not shown) therein. The input/output shaft assists in restricting the longitudinal movement of the input members 200a, 200b along the transmission device 10. In further embodiments, it would be appreciated that the input/output shaft may be, for example, integrally formed with the input member 200a, 200b. The input members 200a, 200b also include an aperture 220a, 220b to respectively receive part of the gear assemblies 300a, 300b therein. Similar to the above, it would also be appreciated that in further embodiments that the input members 200a, 200b may be integrally formed with at least part of the gear assembly 300a, 300b to provide a connection therebetween.

The input members 200a, 200b separately include an engagement portion 230a, 230b. The engagement portions 230a, 230b in this embodiment include a plurality of recesses that form teeth shape bearing faces. The teeth shaped bearing faces are respectively configured to engage with corresponding faces on the gear assembly 300a, 300b, as outlined below. The recesses also include a back bearing face which assists in a stopping the gear assemblies 300a, 300b from further moving in a direction parallel with the longitudinal axis 102. That is, the back bearing face provides a stop in a direction towards the end plate 114 for the gear assemblies 300a, 300b.

The input members 200a, 200b are respectively supported by bearings 202a, 204a, 202b, 204b. The bearings 204a, 204b are directly supported by at least one component of the gear assemblies 300a, 300b, as further outlined below. The bearings 202a, 202b bear directly on the body 100. The bearings 202a, 204a, 202b, 204b allow the input members 200a, 200b to respectively rotate around an axis of rotation that coincides with the longitudinal axis 102 in this embodiment. It will be appreciated that the axis of rotation is a central axis along the input members 200a, 200b where a moment of force is typically applied therearound. The axis of rotation extends in a direction between the end plates 114, 124.

The gear assemblies 300a, 300b each respectively include an inner gear in the form of sun gear 310a, 310b. The sun gears 310a, 310b each include a gear portion 312a, 312b and an extension portion 314a, 314b. The gear portions 312a, 312b each include spur cut gears. The extension portions 314a, 314b respectively extend away from a middle area of the gear portions 312a, 312b. The extension portions 314a, 314b are configured to be received and connect with respective apertures 220a, 220b of the input members 200a, 200b.

The sun gears 310a, 310b respectively engage with intermediate gears 320a, 320b of the gear assemblies 300a, 300b. That is, in this embodiment, sun gear 310a engages with three intermediate gears 320a and, similarly, sun gear 310b engages with three intermediate gears 320b. The intermediate gears 320a, 320b are planetary gears that are spur cut. It would be appreciated by a person skilled in the art that the gear ratio of sun gear 310a to intermediate gear 320a may be different to sun gear 310b to intermediate gear 320b depending on the application required.

The intermediate gears 320a, 320b are respectively connected together with carrier 350a, 350b. The carriers 350a, 350b include a plurality of protrusions that respectively extend through the intermediate gears 320a, 320b. This is further evident in FIG. 4 (note that carrier 350a has been removed from FIG. 4 for ease of viewing reference). The carriers 350a, 350b also include a central portion for connecting an input/output member shaft thereto. As the carriers 350a, 350b turn with the intermediate gears, an output ratio is delivered to the output/input member.

The intermediate gears 320a, 320b respectively engage with the outer gears 330a, 330b of the gear assemblies 300a, 300b. The outer gears 330a, 330b are ring gears that include spur cut gears along an inner surface. The intermediate gears 320a, 320b respectively roll around the inner surface of the outer gears 330a, 330b to provide an output rate to the output member. The outer gears 320a, 320b are respectively connected to selecting members 340a, 340b of the gear assemblies 300a, 300b, as outlined further below.

The selecting members 340a, 340b are substantially circular. The selecting members 340a, 340b each include a first portion 342a, 342b and a second portion 344a, 344b. The first portions 342a, 342b are releasably connected to the second portions 344a, 344b with one or more fasteners, respectively. In this embodiment, the first portions 342a, 342b and/or second portions 344a, 344b respectively engage bearings 346a, 346b. The bearings 346a, 346b allow the selecting members 340a, 340b to respectively rotate relative to the body 100, as further outlined below. The first portions 342a, 342b and/or second portions 344a, 344b also respectively support the bearings 204a, 204b between the input members 200a, 200b and the selecting members 340a, 340b.

The second portions 344a, 344b of the selecting members 340a, 340b are respectively fixed to the outer gears 330a, 330b. In this regard, movement of the selecting members 340a, 340b respectively causes movement of the outer gears 330a, 330b. The selecting members 340a, 340b also respectively includes one or more releasable contacting portions 348a, 348b. The contacting portions 348a, 348b are in the form of teeth around the selecting member 340a, 340b. These teeth include a number of contacting faces. The contacting portions 348a, 348b are configured to releasably engage with the engagement portions 230a, 230b of the input members 200a, 200b.

The transmission device 10 also includes actuation members 400a, 400b. The actuation members 400a assist in moving one or more parts of the gear assemblies 300a, 300b, as further outlined below, and it will be appreciated that in further embodiments that the actuation members 400a, 400b may take a variety of forms to move the gear assemblies 300a, 300b and/or input members 200a, 200b.

In this embodiment, the actuation members 400a, 400b include a substantially cylindrical body. The actuation members 400a, 400b are respectively configured to slidably receive and support the gear assemblies 300a, 300b therein. The actuation members 400a, 400b respectively include an internal extension member 402a, 402b that extends away from the substantially cylindrical body. The internal extension members 402a, 402b respectively assist in moving the gear assemblies 300a, 300b via the selecting members 340a, 340b. That is, the internal extension members 402a, 402b respectively extend into the selecting members 340a, 340b. In this regard, the selecting members 340a, 340b are respectively located either side of the internal extension members 402a, 402b in this embodiment.

The outer surface of the cylindrical bodies for the actuation members 400a, 400b are slidably supported by an interior surface of the body 100. The actuation members 400a, 400b also respectively include outer extension members 404*a*, 404*b*. The outer extension members 404*a*, 404*b* engage with the inner surface of the body 100 to form a number of channels. The channels are respectively connected to the inlet fluid ports 116, 126 and outlet fluid ports 118, 128. As outlined further below, the direction of fluid travel through the fluid ports 116, 118, 126, 128 allows the gear assemblies 300*a*, 300*b* to provide different output rates to the output member.

Figure 2:
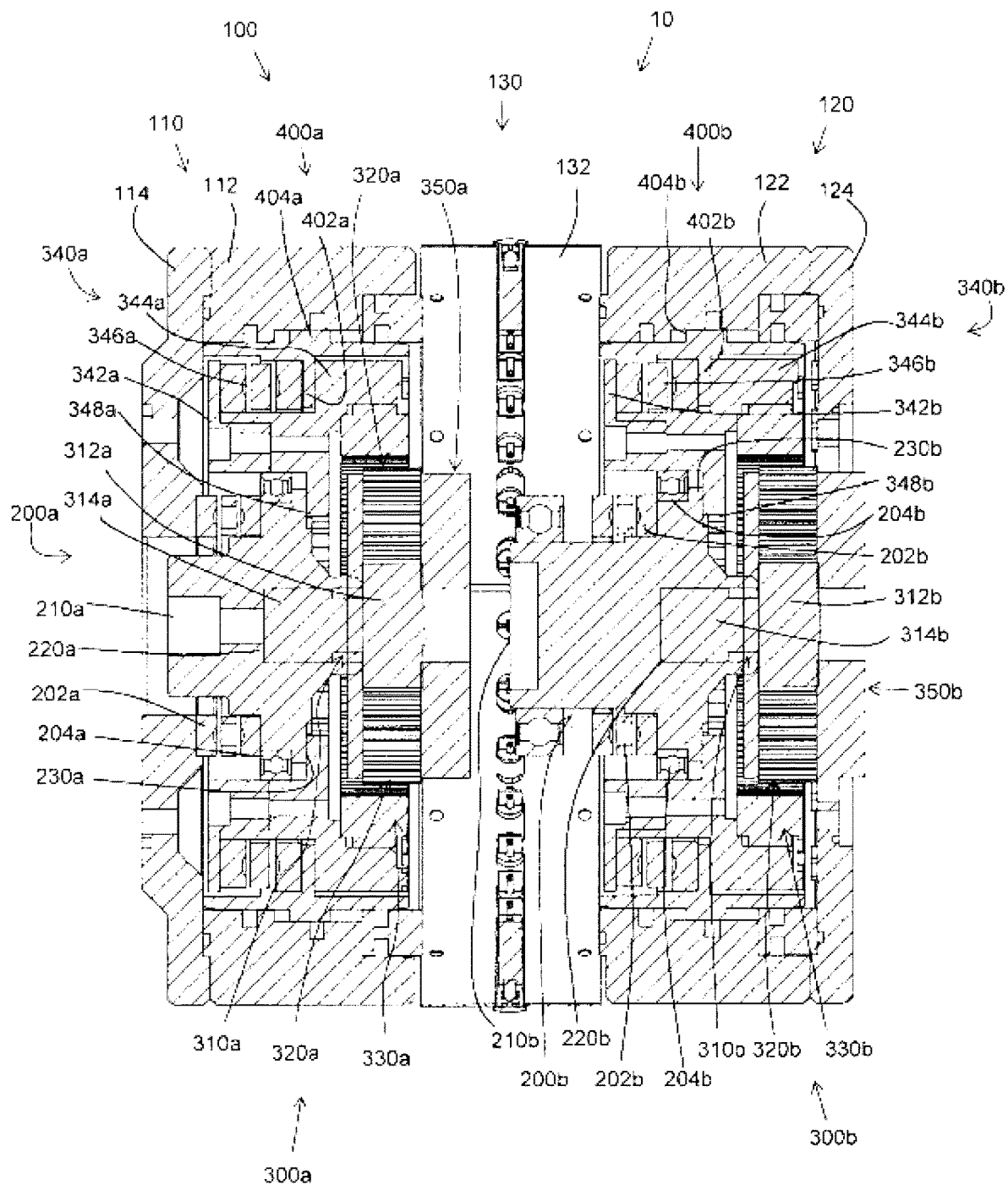
FIG. 2 illustrates a cross sectional view of the transmission device in FIG. 1, according to an embodiment of the invention, in a first configuration.

FIG. 2 shows components of the transmission device 10 in a first position. That is, the actuator 400*a* is positioned against the end plate 114. This in turn positions the selecting member 340*a* between the end plate 114 and the middle portion 130 such that there is not engagement therebetween. Similarly, in the first position of this embodiment, the actuator 400*b* is positioned against the middle portion 130. This in turn positions the selecting member 340*b* between the end plate 124 and the middle portion 130 such that there is not engagement therebetween.

In the first position, the contacting portions 348*a* of the selecting member 340*a* are engaged with the engagement portions 230*a* of the input member 200*a*. In this regard, rotation of the input member 200*a* will cause the selecting member 340*a* to rotate at the same rate in the first position. This results in the outer gear 330*a* rotating at the same rate as the input member 200*a* which in turn allows an output rate through the carrier 350*a* to be the same as the input member 200*a*.

Accordingly, in the first position, when the carrier 350*a* is connected to an output member (i.e. the sun gear 310*b*), the output member will rotate at substantially the same rate as the input member 200*a* (i.e. there is a 1:1 ratio). Similarly, as the contacting portions 348*b* of the selecting member 340*b* are engaged with the engagement portions 230*b* of the input member 200*b*, this will result the carrier 350*b* delivering a rotational rate to an output member that is the same as the input member 200*b*. In practice, the input member 200*a* is typically connected to a rotating shaft of a motor whilst the output member that is connected to the carrier 350*b* will be attached to an auger. Accordingly, in the first position, the auger will spin at the same rate as the motor. The motor includes at least two set speeds to provide further speed/torque ratios in this embodiment.

Figure 3:
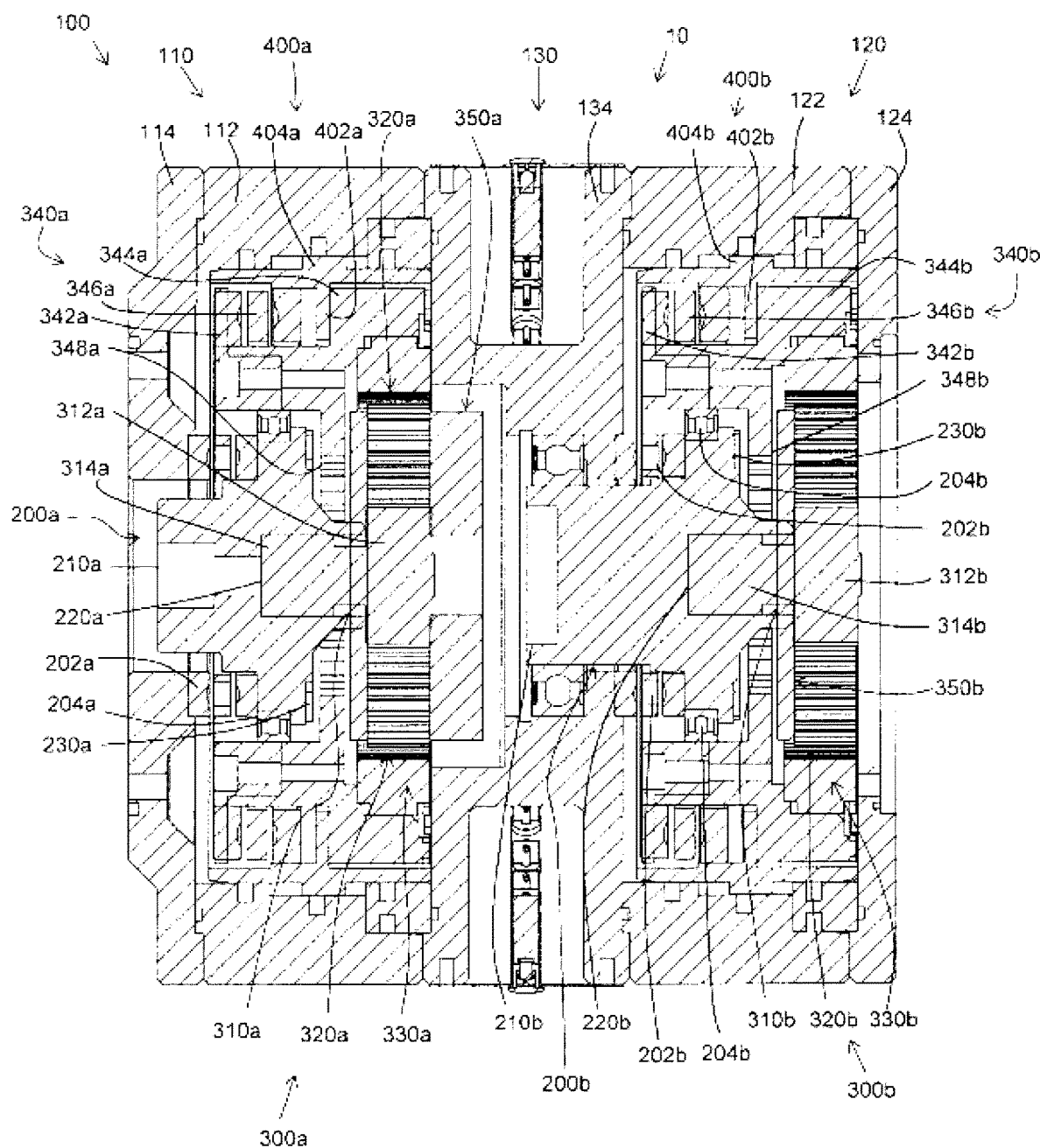
FIG. 3 illustrates a cross sectional view of the transmission device in FIG. 1, according to an embodiment of the invention, in a second configuration.

FIG. 3 shows components of the transmission device 10 in a second position. In this embodiment, movement of the components in the transmission device 10 to the second position is based on a hydraulic pressure system associated with the above motor spinning the auger. When the transmission device 10 senses that a predetermined pressure has been passed, and additional torque is required at the auger, further hydraulic fluid will be passed through the inlet fluid ports 116, 126. As a result, the actuator 400*a* slides in a direction, that is substantially parallel with the axis of rotation for the sun gear 310*a*, towards the middle portion 130. Similarly, the actuator 400*b* slides in a direction, that is substantially parallel with the axis of rotation for the sun gear 310*b*, towards the end plate 124.

In this regard, in the second position, the actuator 400*a* is positioned against the connecting portion 134. This in turn positions the selecting member 340*a* against the body 100 in a manner that prevents the selecting member 340*a* from rotating. In this embodiment, (dog) teeth on both the selecting member 340*a* and connection portion 134 prevent the rotation therebetween when engaged. Similarly, in the second position of this embodiment, the actuator 400*b* is positioned against the end plate 124. This in turn positions the selecting member 340*b* against the body 100 in a manner that prevents the selecting member 340*a* from rotating. That is, (dog) teeth on the end plate 124 engage with (dog) teeth on the selecting member 340*b* to prevent relative rotation therebetween.

With rotation of the selecting member 340*a* locked in the second position, the intermediate gears 320*a* are rotated around the outer gear 330*a* to produce an output rate through the carrier 350*a* that is different to the input member 200*a* driving the sun gear 310*a*. In this regard, the output member, which is normally connected between the carrier 350*a* and input member 200*b*, is rotated at a different rate compared to the input member 200*a*. Similarly, as the selecting member 340*b* is locked in the second position, the intermediate gears 320*b* are rotated around the outer gear 330*b* to produce an output rate through the carrier 350*b* that is different to the input member 200*b* driving the sun gear 310*b*. The carrier 350*b* is typically connected to the auger and, therefore, a higher torque is delivered to the auger when the components of the transmission device 10 are in the second position.

From the above, it will also be appreciated that the transmission device 10 may be operated to obtain different gear ratios compared to that in FIGS. 2 and 3. For example, in a further configuration, the first stage of the transmission device 10 (i.e. the input member 200*a* and gear assembly 300*a*) may deliver a 1:1 ratio (or rate), by being in the first position, whilst the second stage of the transmission device 10 (i.e. the input member 200*b* and gear assembly 300*b*) delivers a different rate by being in the second position. The preferred gear ratio can be determined by the fluid pressure in the hydraulic system, as outlined above. Further stages (i.e. further modules including an input member, gear assembly and output member) may also be added onto the transmission device 10 to obtain further gear ratios. Alternatively, one stage (or module) may be used in further embodiments. Indeed, a preferred embodiment of the present invention may comprise only a single stage (or module), in which the output shaft is driven by carrier 350*a*. Moreover, as also evident above, it will also be appreciated that the gear assemblies 300*a*, 300*b* may produce different ratios depending on the gears used therein.

Figure 5:
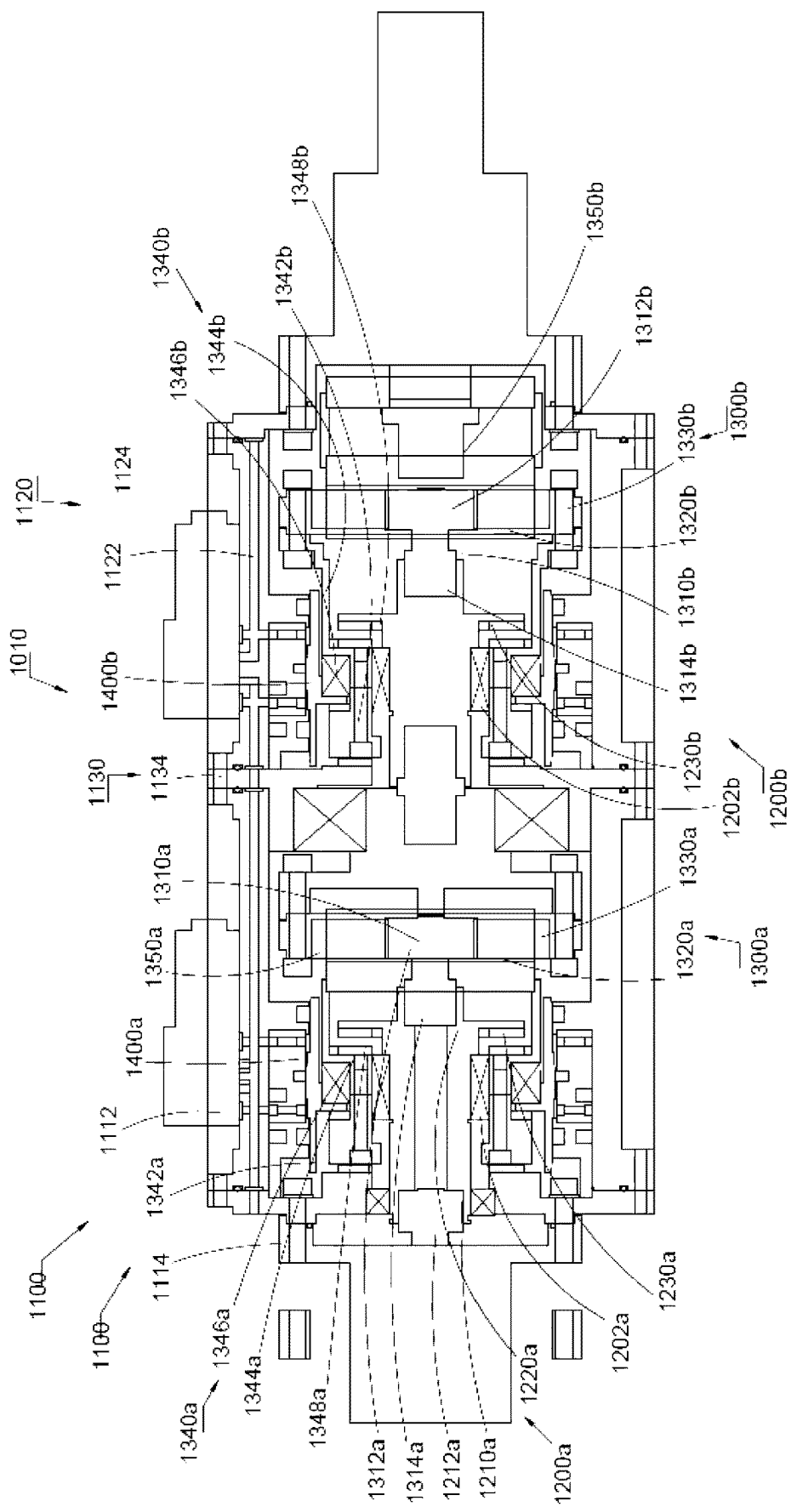
FIG. 5 illustrates a cross sectional view of a further transmission device, according to an embodiment of the invention

FIG. 5 shows a further embodiment of a transmission device 1010, according to an embodiment of the invention. The transmission device 1010 includes similar components to the transmission device 10 and, therefore, similar numbering has been used (e.g. '1010' compared to '10').

The transmission device 1010 includes a body 1100 having a first portion 1110, a second portion 1120 and a middle portion 1130. The first portion 1110 and the second portion 1120 respectively include a housing 1112, 1122 and end portions 1114, 1124. The middle portion 1130 includes a connecting portion 1134 that connects the housings 1112, 1122 together.

The transmission device 1010 also includes a first stage (or set) having an input member 1200*a* and gear assembly 1300*a*. Similar to the transmissions device 10, the input member 1200*a* includes an aperture 1210*a* for receiving an input shaft 1212*a*. The input member 200*a* also includes an aperture 1220*a* to receive part of the gear assembly 1300*a* therein. The input member 1200*a* is also rotatably supported by bearing 1202*a*. The input member 1200*b* of the second stage includes substantially the same features as the input member 1200*a*.

A difference between the input members 1200*a*, 1200*b* and the input members 200*a*, 200*b* is that the engagement portions 1230*a*, 1230*b* of the input members 1200*a*, 1200*b* are located on an opposite face. That is, the engagement portions 1230*a*, 1230*b* face in a direction towards the input shaft 1212*a*.

The gear assemblies 1300a, 1300b are similar to gear assemblies 300a, 300b. For example, the gear assemblies 1300a, 1300b include sun gears 1310a, 1310b, intermediate gears 1320a, 1320b and outer gears 1330a, 1330b. The sun gears 1310a, 1310b each include a gear portion 1312a, 1312b and an extension portion 1314a, 1314b. The intermediate gears 1320a, 1320b include three separate gears. The carriers 1350a, 1350b respectively connect the intermediate gears 1320a, 1320b together. The selecting members 1400a, 1400b also respectively include a first portion 1342a, 1342b that is releasably connected to a second portion 1344a, 1344b. The selecting members 1400a, 1400b are respectively supported by bearing 1346a, 1346b.

In comparison to the selecting member 400a, 400b, the selecting members 1400a, 1400b both include contacting portions 1348a, 1348b that respectively engage in a manner towards the inner gears 1310a, 1310b. Furthermore, the first portions 1342a, 1342b both include dog teeth (or protrusions) on one end for respectively engaging the end portion 1114 and middle portion 1130.

The transmission device 1010 works in a similar way to the transmission device 10 but with the following evident differences. With the positions of transmission device 10 in mind, FIG. 5 shows the transmission device 1010 in the second position. The dog teeth on the selecting members 1400a, 1400b are engaged with the end portion 1114 and middle portion 1130, respectively, to prevent rotational movement thereof. In this regard, the intermediate gears 1320a are rotated around the outer gear 1330a to produce an output rate through the carrier 1350a that is different to the input member 1200a driving the sun gear 1310a. Similarly, the intermediate gears 1320b are rotated around the outer gear 1330b to produce an output rate through the carrier 1350b that is different to the input member 1200b driving the sun gear 1310b.

To shift transmission device 1010 to a 1:1 ratio, hydraulic fluid is pumped to allow the actuating members 1400a to shift towards the middle portion 1130 (e.g. the middle lateral axis of the body 1100) whilst the actuating member 1400b shifts away from the middle portion 1130. This in turn moves the selecting members 1340a, 1340b in a manner that allows the contacting portions 1348a, 1348b to respectively engage and releasably lock with the engagement portions 1230a, 1230b. As a result, the input members 1200a, 1200b will cause the selecting members 1340a, 1340b to rotate at the same rate. This results in the outer gears 1330a, 1330b rotating at the same rate as the input members 1200a, 1200b which in turn allows an output rate through the carriers 1350a, 1350b to be the same as the input members 1200a, 1200b.

FIGS. 6 to 9 illustrate schematics of a hydraulic system associated with the transmission devices 10, 1010, according to an embodiment of the invention. The hydraulic system is shown in different states in FIGS. 6 to 9.

Figure 6:
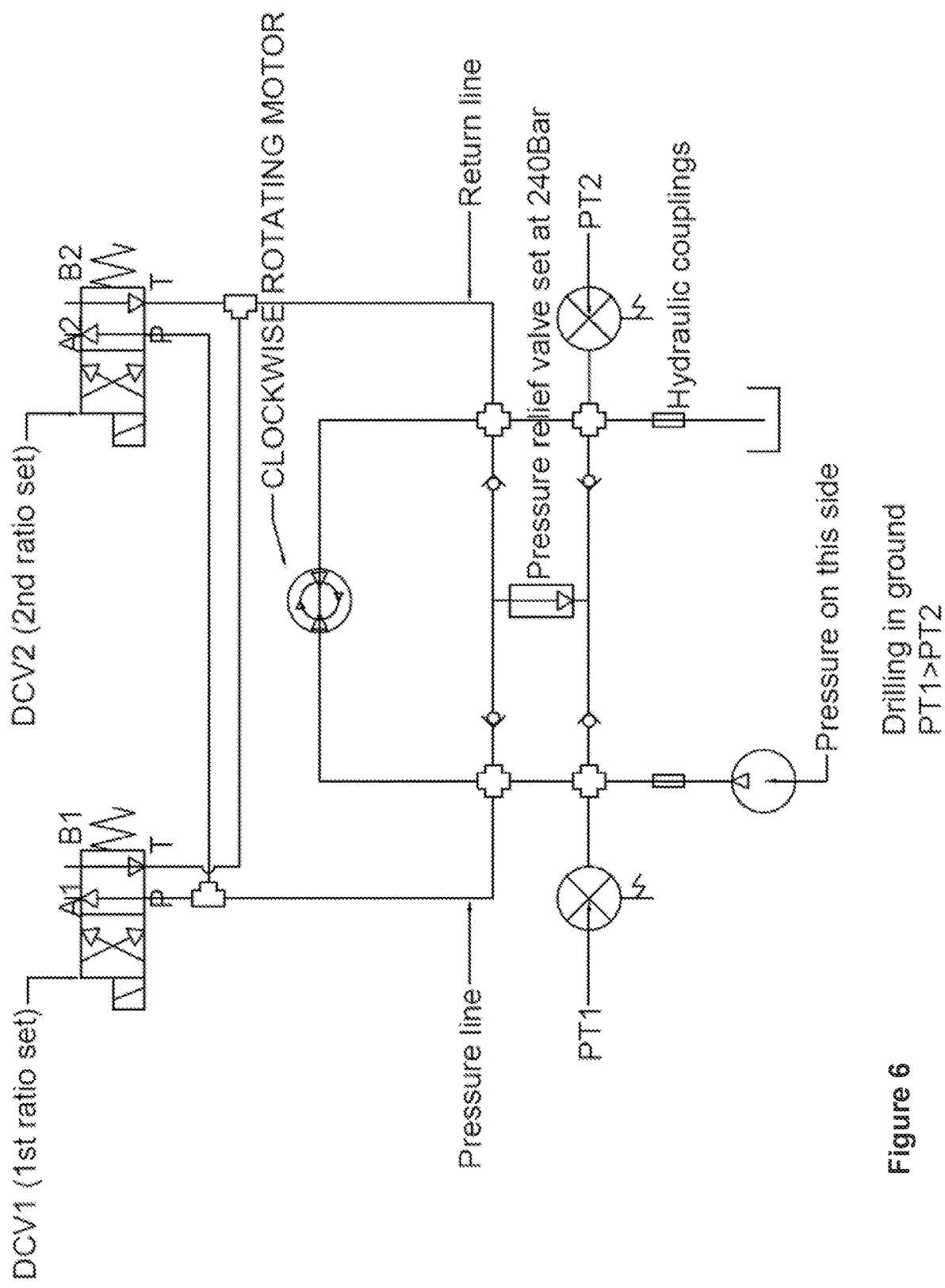
FIG. 6 illustrates a schematic of a hydraulic system associated with the transmission devices in FIGS. 1 and 5, according to an embodiment of the invention.

In FIG. 6, the abovementioned motor that provides rotation to the input members 200a, 1200a is rotating in a clockwise direction for drilling. The pressure assisting to turn the motor is used to respectively actuate the transmission devices 10, 1010. That is, depending on the torque required and/or the direction of rotation of the motor, hydraulic fluid is directed through A1, B1, A2, B2 to inlet/outlet fluid ports 116, 118, 126, 128, 1116, 1118, 1126, 1128. In this embodiment, the routing of hydraulic fluid in FIG. 6, via the directional control valves associated with A1, B1, A2, B2, allows the transmission devices 10, 1010 to be set in the second position. It will be appreciated by a person skilled in the art that the pressure required to activate the transmission devices 10, 1010 is relatively low in comparison to the pressure required to actuator the abovementioned motor.

Figure 7:
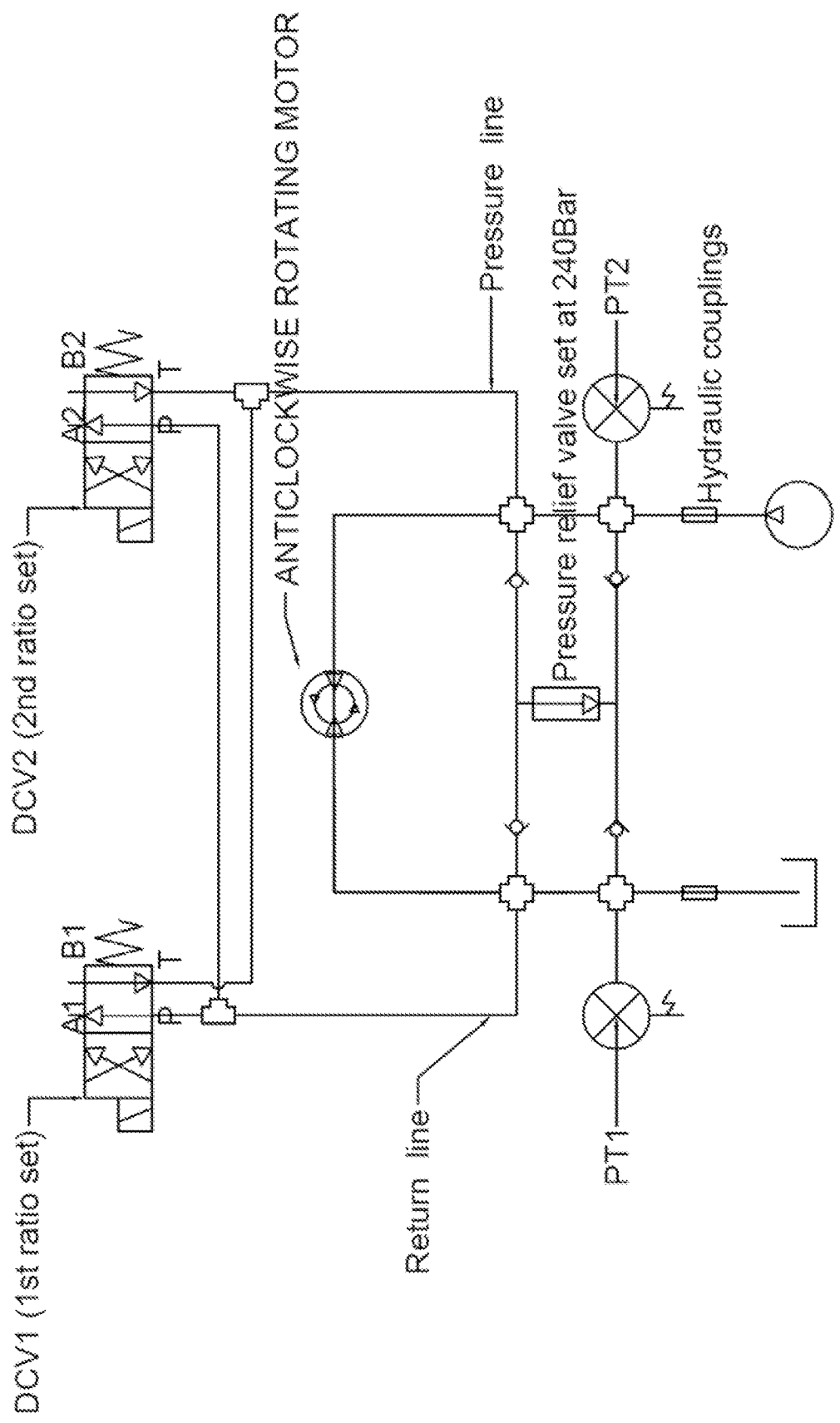
FIG. 7 illustrates the schematic of the hydraulic system in FIG. 6, in a second state, according to an embodiment of the invention.

In FIG. 7, the motor is shifted in a reverse direction (i.e. unwound from the ground). As the torque required in this condition is typically less, the hydraulic fluid in FIG. 7 is directed in a manner to allow the transmission devices 10, 1010 to be set in the first position (i.e. in a 1:1 ratio). However, it will be appreciated that in different states, if further torque is required whilst the motor is moving in the reverse direction, the hydraulic fluid may be routed in the manner shown in, for example, FIG. 6. In this regard, it will be appreciated by a person skilled in the art that the present invention uses the pressure difference between pressure sensors PT1 and PT2 to determine the direction of the motor, the torque required and where the hydraulic fluid should be suitably routed in the transmission devices 10, 1010.

Figure 8:
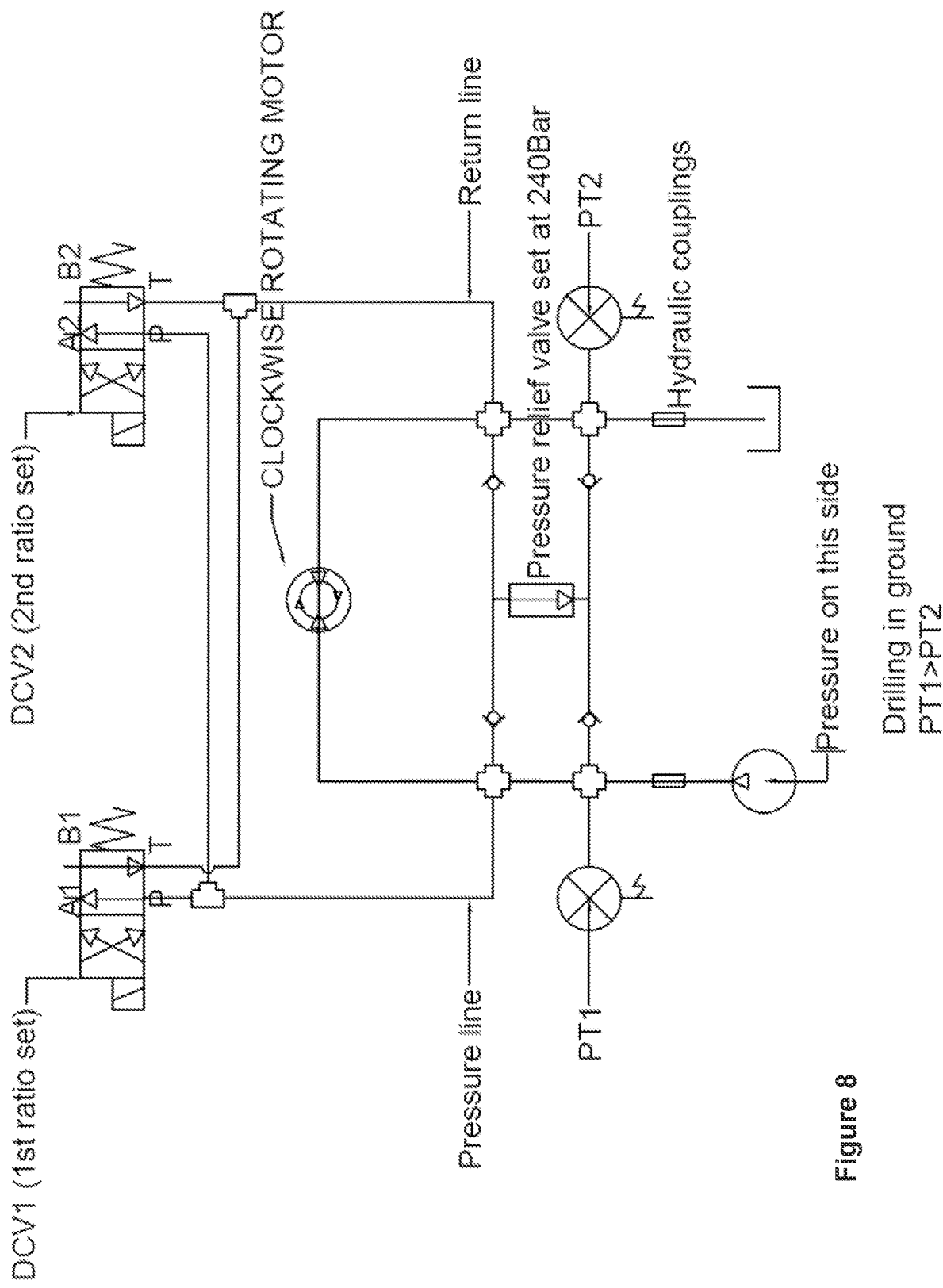
FIG. 8 illustrates the schematic of the hydraulic system in FIG. 6, in a third state, according to an embodiment of the invention.
Figure 9:
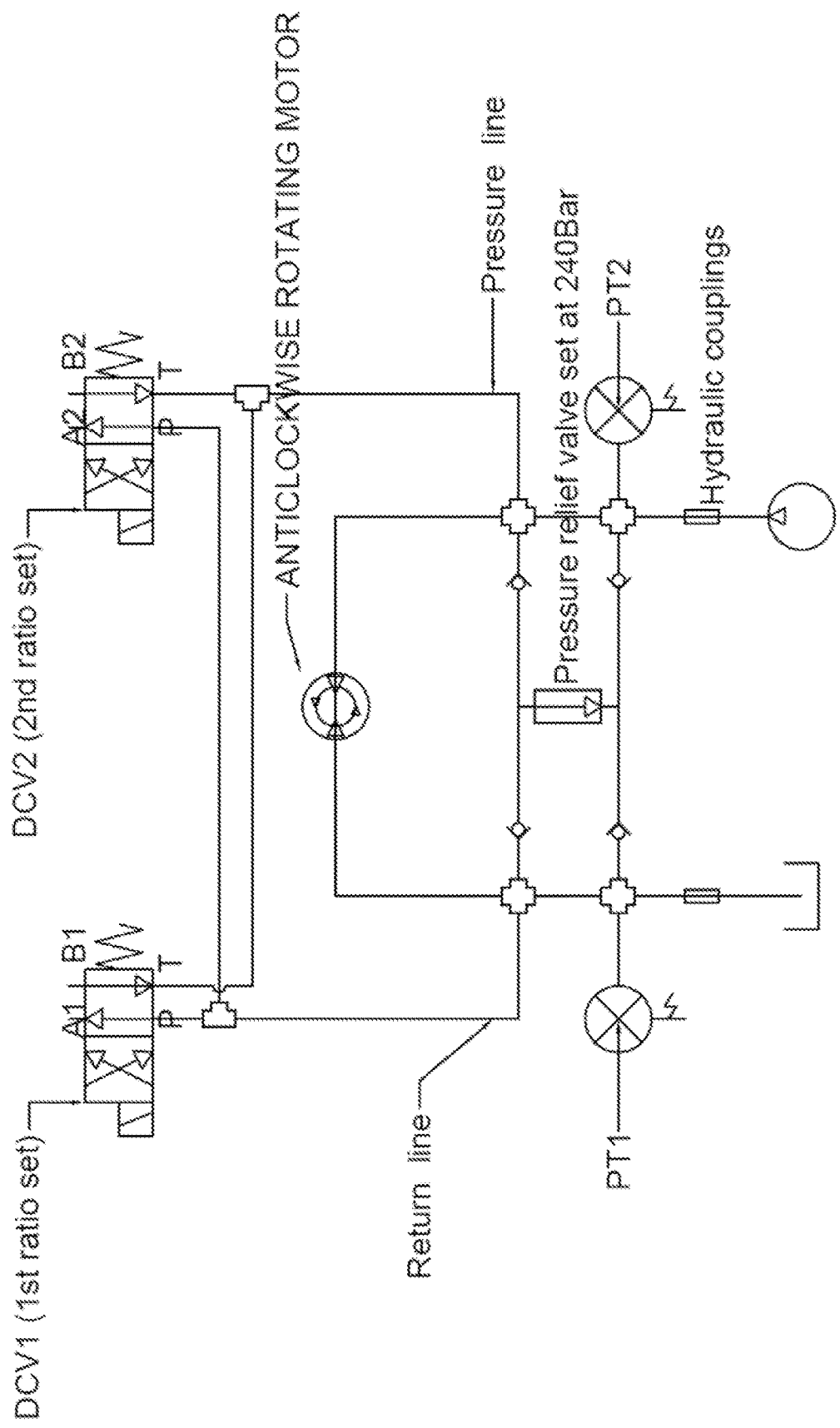
FIG. 9 illustrates the schematic of the hydraulic system in FIG. 6, in a fourth state, according to an embodiment of the invention.

FIGS. 8 and 9 illustrate the pressure relief valve in the hydraulic system venting excess pressure to a reservoir. This assists in protecting the transmission devices 10, 1010 from being overstressed through the higher hydraulic pressure provided to the motor. In this regard, the pressure relief valves act as a mechanical safeguard in the present invention.

The transmission devices 10, 1010 allow multiple gear ratios to be obtained. This significantly improves the efficiency of drilling operations. By way of example, in the first position, the transmission devices 10, 1010 allow an auger to drill relatively quickly through earthen material. However, when it is determined that further torque is required, one or more of the sets may move to the second position to provide a suitable torque/drilling speed.

The transmission devices 10, 1010 also allow for higher gear reductions in comparison to, for example, typical automotive transmissions. For example, the overall gear reductions in earthen drilling machine are typically above 8:1 and it is not uncommon for earth drilling machines to require a reduction above 150:1. The transmission devices 10, 1010 are configured to accommodate these large reductions.

The use of controlling the gear ratio required through using hydraulic pressure in the system assists in promptly selecting the suitable gear ratio required. This avoids lag within the system and assists in preventing underutilisation of the drilling system. Moreover, monitoring the pressure in the hydraulic system allows a suitable force to be applied on the relevant components in the transmission devices 10, 1010. This assists in keep the transmission devices 10, 1010 in a suitable gear by, for example, holding the (dog) teeth of the selecting members 340a, 340b, 1340a, 1340b in place.

The movement of at least one component, in a direction substantially parallel to the axis of rotation for the input members 200a, 200b, 1200a, 1200b, allows for simple changing of the gear ratio to achieve the required torque/speed ratio. Other transmissions provide much more complicated arrangements, with helical gears, which are not suitable in the present application.

Furthermore, having the cylindrical actuating members 400a, 400b, 1400a, 1400b surround and support the working parts therein (e.g. the gear assemblies 300a, 300b, 1300a, 1300b) allows for the working parts to be standard. That is, typically gears and the alike may be used in the transmission devices 10, 1010, which assists in reducing costs and finding suitable replacements for overworn parts.

The use of (dog) teeth in the transmission device 10, 1010 also allows for higher torques to be transferred in comparison to, for instance, clutch packs, bands and the alike in common automatic transmissions.

In addition, the transmission devices 10, 1010 can easily retrofitted to earthen drilling machines such that the hydraulic system thereon remains substantially standard. In particular, as evident from the hydraulic system shown in FIGS. 6 to 9, the transmission devices 10, 1010 only require two connections to an existing hydraulic motor used for drilling.

The transmission devices 10, 1010 also do not require operator input as they automatically selecting the torque/speed required based on the drilling conditions. For example, the bidirectional control through the directional control valves, along with use of the pressure sensors PT1, PT2, allow the transmission devices 10, 1010 to adapt to the change in directions of the hydraulic motor whilst maintaining a suitable torque/speed required.

Figure 10:
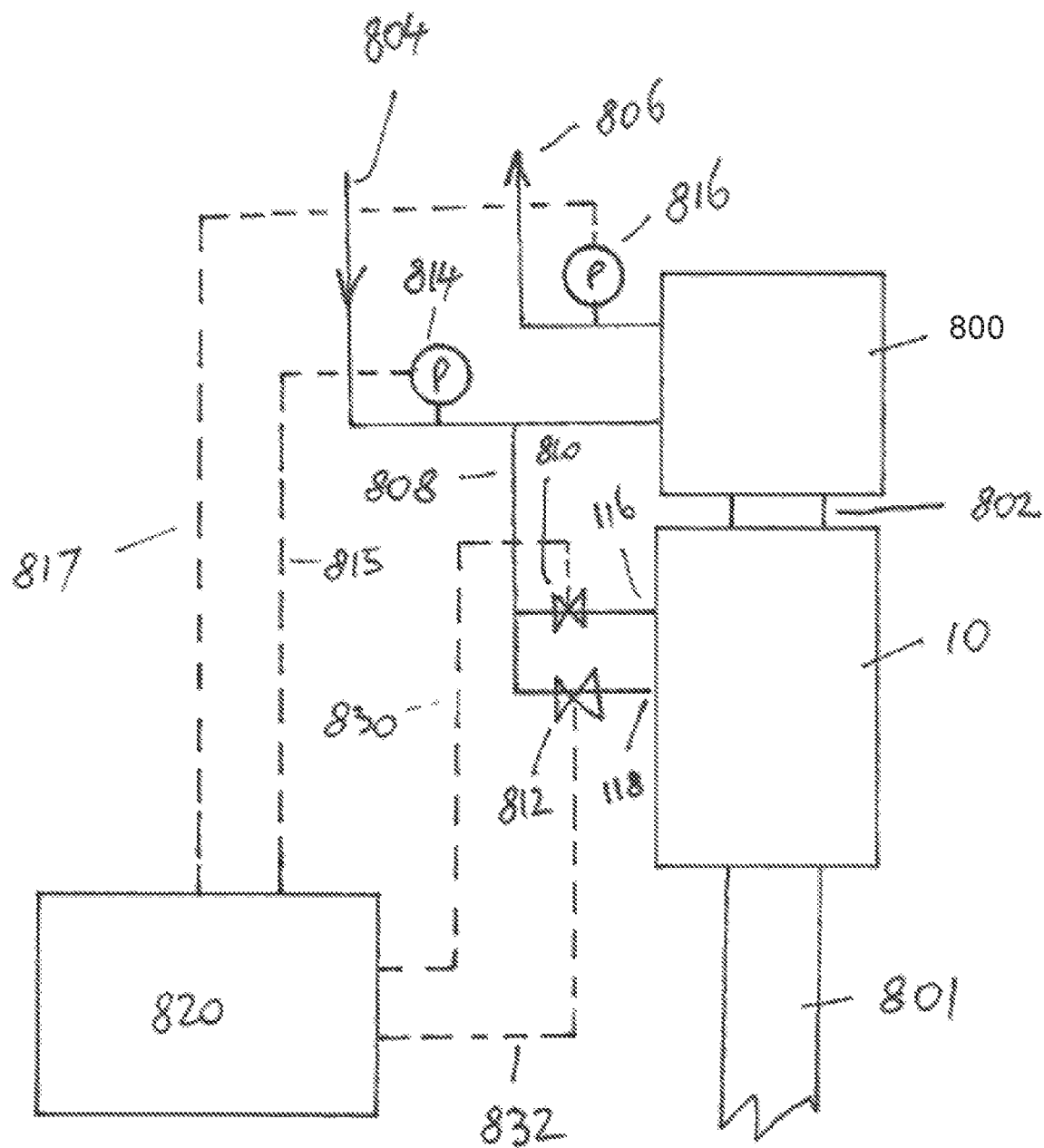
FIG. 10 shows a schematic diagram of a control system for use with an embodiment of the present invention.

FIG. 10 shows a schematic diagram of a transmission device 10 in accordance with an embodiment of the present invention, the transmission device 10 being driven by a hydraulic motor 800. The transmission device 10 drives an auger, part of which is shown at 801. The hydraulic motor 800 has an output shaft 802 that connects with or forms an input shaft to the transmission device 10. The hydraulic motor 800 has an input hydraulic line 804 which supplies pressurised fluid to the motor to drive the motor. The hydraulic motor 800 has an output hydraulic line that removes hydraulic fluid from the motor. The hydraulic lines 804, 806 may be connected to a manifold. A further hydraulic line 808 is used to provide high pressure hydraulic fluid to ports 116, 118 of the transmission device 10. Solenoid valves 810, 812 are used to control the flow of hydraulic fluid to respective ports 116, 118.

Hydraulic line 804 includes a pressure sensor 814. Hydraulic line 806 includes a pressure sensor 816. The arrangement shown in FIG. 10 also includes a control system 820. The control system 820 receives pressure readings from pressure sensors 814, 816 (as shown via the dashed lines 815, 817). These pressure signals from the pressure sensors may be received via one or more dedicated wires or via a wireless communication arrangement.

The control system 820 includes a printed circuit board or a computer memory upon which the control system strategy is programmed or recorded. The control system 820 receives pressure readings from pressure sensors 814, 816. When the control system is first turned on for a particular day and the motor and transmission operated, the control system receives pressure readings from pressure sensors 814, 816. When the control system determines that the signals received from the pressure sensors 814, 816 mean that the pressure/differential pressure in the motor is not changing, or is changing below a predetermined rate, the control system concludes that the motor is nearing a stall. The pressure/differential pressure is then recorded in the control system and is used to determine a gear change hydraulic pressure. The gear change hydraulic pressure may be, for example, calculated as being slightly below the recorded pressure. In this manner, the gear change hydraulic pressure will cause the transmission device to change gear before the motor stalls. The gear change hydraulic pressure may be set at a set amount below the recorded pressure or at, say, 95% of the recorded pressure. In this manner, the control system can determine the relevant operating parameters for the motor and transmission device without having to rely upon using a pre-set gear change hydraulic pressure being programmed into the control system.

When the pressure signal is received from the pressure sensors 814, 816 indicate that the gear change hydraulic pressure has been reached, the control system sends signals to the solely valves 810, 812, via communication lines 830, 832, to change the supply of fluid to the port 116 or 118, which then causes the transmission device 10 to change to a slower gear.

When the pressure signals received from pressure sensors 814, 816 indicate that the pressure in the motor 800 is below a predetermined minimum value, the control system concludes that the auger may be driven in a low torque/high-speed mode and the control system will then send control signals to the solenoid valves 810, 812 to cause the transmission device 10 to change to a higher speed output.

In embodiments where the control system 820 is used to change the speed of a multispeed motor, the control system 820 will send control signals to the motor to change the speed of the motor.

Figure 11:
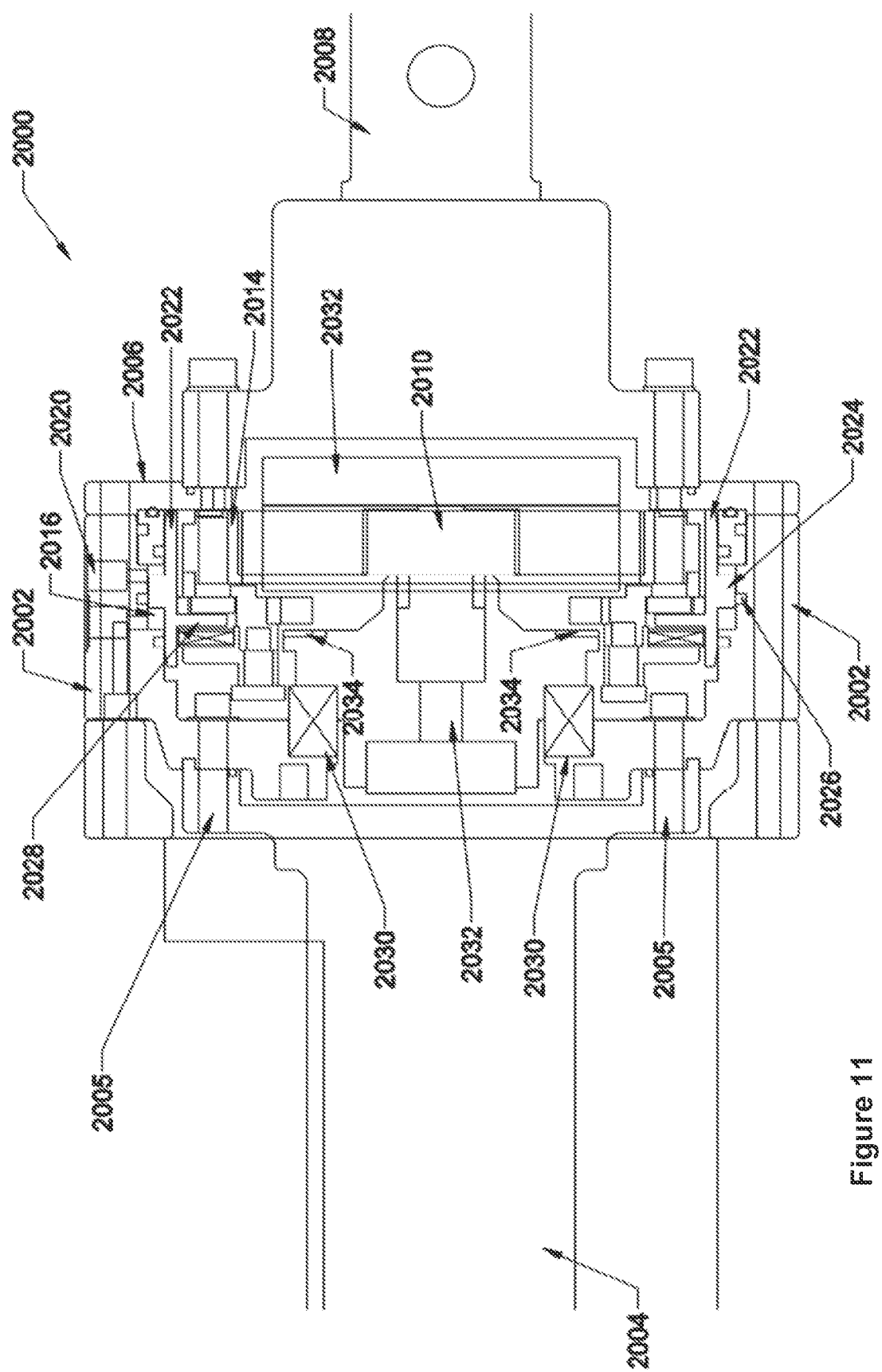
FIG. 11 shows a cross-sectional view of a transmission device in accordance with another embodiment of the present invention.

FIG. 11 shows a simplified cross sectional view of the transmission device in accordance with another embodiment of the present invention. The transmission device 2000 shown in FIG. 11 comprises a main housing 2002. A motor and bell housing 2004 is connected by use of bolts 2005 to the main housing 2002. An end plate 2006 is attached to the other end of the main housing. The transmission device has an output shaft 2008 connected thereto. Drive from the transmission device causes the output shaft 2008 to rotate.

The gear arrangement includes a sun gear 2010, planet gears 2012 that can rotate around the sun gear 2010 and ring gear 2014. The ring gear may be provided with a series of dog teeth on its end wall. The planet gears 2012 are held in a carrier, in a manner similar to that as shown in FIGS. 2 to 4.

The main housing 2002 is provided with a fluid channel 2016 that has two ports 2018, 2020 and an actuating member 2022 is mounted for slidable axial movement within the main housing 2002. The actuating member 2022 has an outwardly extending projection 2024 that is located within fluid channel 2016. The outer periphery of outwardly extending projection 2024 contacts a seal (such as an O-ring) 2026 so that a seal is formed between the outwardly extending projection 2024 and the wall of the fluid channel 2016. In use, if pressurised hydraulic fluid is supplied to port 2018, the actuating number 2022 moves towards the right (as shown in FIG. 11), whereas if pressurised hydraulic fluid is supplied to port 2020, the actuating member 2022 moves towards the left. The actuating member 2022 is in the form of a hollow cylinder having outwardly extending projection 2024 and an inwardly extending projection 2028. A thrust bearing 2030 is also mounted in the main housing 2002.

Figure 4:
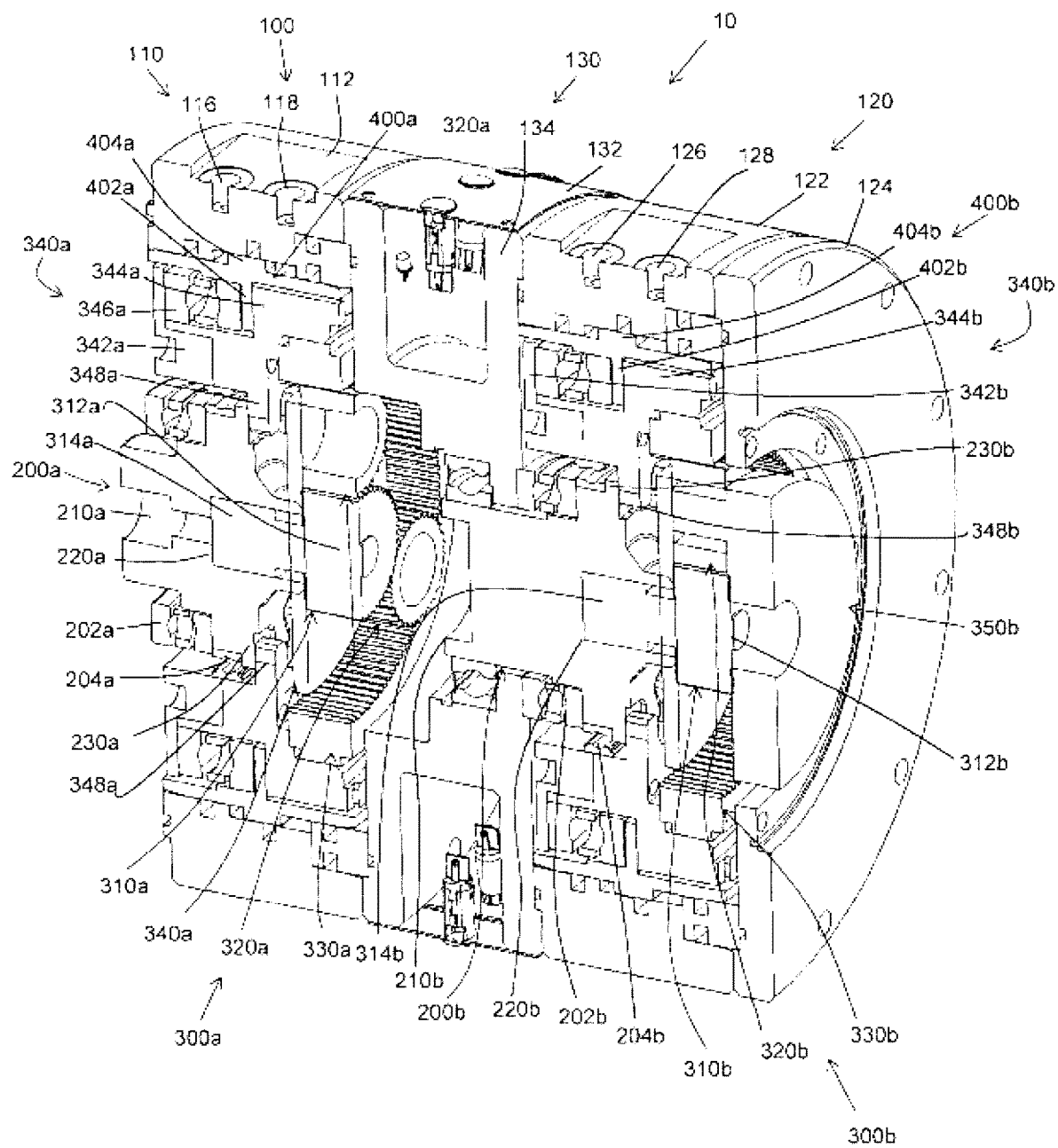
FIG. 4 illustrates a perspective cross-sectional view of the transmission device in FIGS. 1 to 3, according to an embodiment of the invention, with some components removed for ease of viewing reference.

Other features of the transmission device 2000 that are not describe a generally similar to the features included in the embodiment shown in FIGS. 2 to 4.

In the view shown in FIG. 11, the actuating member 2022 has been moved to the right so that the transmission device is in the second position. In this position, the dog teeth on the ring gear engage with complementary dog teeth on the end plate 2006. As a result, the ring gear 2014 is locked against rotation relative to the main housing 2002. When the input shaft 2032 from the motor is rotated, the sun gear 2010 also rotates. This, in turn, causes the planet gears 2012 to rotate. As the carrier 2032 for the planet gears is connected to the output shaft (by a connection that is not shown), the output shaft 2008 is caused to rotate at a reduced rate as the planet gears are effectively operating to give the output shaft a lower speed.

When the actuating member 2022 is moved to the left, the dogs associated with the ring gear disengage from the dogs on the end plate 2006 of the housing 2002. This causes dogs

2034 that rotate with the input shaft to engage with similar dogs on the sun gear/ring gear, thereby causing the sun gear and ring gear to rotate at the same speed as the input shaft. This effectively locks the planet gears in position relative to the sun gear and ring gear. As a result, the planet carrier, which is connected to the output shaft, is also caused to rotate at the same speed as the input shaft, thereby giving a 1:1 ratio between the input shaft speed and the output shaft speed.

The skilled person will also understand that various other seals will be used in the transmission device 2000 in order to ensure that oil does not leak from the housing.

Other advantageous features of preferred embodiments of the present invention include the gear change actuator being a cylindrical member that encompasses the gear box. As a result, the transmission device can have a round outer shape without requiring any bulky actuators protruding out from the casing. Further, the force exerted on the gear change parts (which can be up to 20 tonnes in some applications) is balanced around the working parts of the transmission, rather than just applied at one point exerting the force required to make the change and then hold the gear in place.

The positioning of the bearings with respect to the gear change actuator and the gears themselves allow for the dog teeth, which holds the torque, to "miss" during the gear change not damage anything. The dog gears can mis-mesh when changing and the only delay is just the small amount of time it takes for the dogs to move past each other so that they can properly seat and engage. Whilst the teeth are misaligned, the various parts carrying the teeth can rotate on bearings, such as thrust bearing 230, until the teeth come into alignment. Further, the design of the dogs may be such that when the dogs are engaged, there is zero axial force on the gear parts in the maximum force that can be actuated during heavy drilling is held by the housing.

Further, using the hydraulic fluid from the drive motor means that an auxiliary hydraulic pump to actuate the gear change and run the transmission is not required. The pressure built up by the hydraulic pump that drives the motor is proportional to the force required to hold the gears from sliding out of gear during heavy drilling. The gear changes occur smoothly as a result of the motor pressured dipping naturally as the gear change occurs, due to load coming off the motor when the transmission is briefly in neutral. Once in gear, and there is no internal movement of the gear change actuator so no energy is wasted in rotating the gear change actuator. Further, the feedback of the hydraulic pressure from the motor is used in the control system to help determine when the gear should be changed.

The control system of preferred embodiments of the present invention operates such that when the drilling program is first used for the day or first used after a shutdown period, a section of the drilling program "listens" for the excavator's pressure relief limit and determines an appropriate gear change pressure from the determined parameter. As a result, no matter which machine the transmission is used on, the control system determines the gear change pressure from operation of the unit, rather than from simply having a pre-set pressure embedded in the control system. As a result, the operator can use all the pressure available on the excavator without going over the pressure relief limit of the excavator. This allows the operator to extract the maximum amount of performance out of any host machine. The gear change pressure (and optionally the excavator's pressure relief limit) is held in memory until the drive is turned off.

In this specification, adjectives such as first and second, left and right, top and bottom, and the like may be used solely to distinguish one element or action from another element or action without necessarily requiring or implying any actual such relationship or order. Where the context permits, reference to an integer or a component or step (or the like) is not to be interpreted as being limited to only one of that integer, component, or step, but rather could be one or more of that integer, component, or step etc.

The above description of various embodiments of the present invention is provided for purposes of description to one of ordinary skill in the related art. It is not intended to be exhaustive or to limit the invention to a single disclosed embodiment. As mentioned above, numerous alternatives and variations to the present invention will be apparent to those skilled in the art of the above teaching. Accordingly, while some alternative embodiments have been discussed specifically, other embodiments will be apparent or relatively easily developed by those of ordinary skill in the art. The invention is intended to embrace all alternatives, modifications, and variations of the present invention that have been discussed herein, and other embodiments that fall within the spirit and scope of the above described invention.

In this specification, the terms 'comprises', 'comprising', 'includes', 'including', or similar terms are intended to mean a non-exclusive inclusion, such that a method, system or apparatus that comprises a list of elements does not include those elements solely, but may well include other elements not listed.

The invention claimed is:

1. A transmission device comprising:
 a body assisting to support components including:
 an input member extending at least part way along the body, the input member having an axis of rotation;
 a gear assembly that is connected to the input member, the gear assembly having:
  an inner gear;
  one or more intermediate gears engaged with the inner gear; and
  an outer gear engaged with the one or more intermediate gears;
 wherein in a first position the gear assembly is configured with the input member to rotate at substantially the same rate as the input member and axial movement of at least one component to a second position, in a direction substantially parallel to the axis of rotation, allows the gear assembly to provide to an output member a different output rate relative to the input member; and
 an actuator is movable between a first position at which the gear assembly can move to its first position, and a second position at which the gear assembly can move to its second position, said actuator being movable under the influence of hydraulic pressure,
 wherein in response to the fluid pressure being on one side of a predetermined value or a determined value, the fluid is directed in the first direction and in response to the fluid pressure being on another side of the predetermined value or determined, the fluid is directed in the second direction.

2. The transmission device as claimed in claim 1, wherein the actuator has a cylindrical portion.

3. The transmission device as claimed in claim 1, wherein the actuator surrounds the gear assembly.

4. The transmission device as claimed in claim 1, wherein the body includes one or more fluid ports.

5. The transmission device as claimed in claim 4, wherein the body includes one or more fluid channels.

6. The transmission device as claimed in claim 5, wherein the actuator includes a projection that extends into a fluid channel that is in fluid communication with a first fluid port and a second fluid port, wherein when pressurised fluid is provided to one of the fluid ports, the actuator moves to the first position and when pressurised fluid is provided to the other of the fluid ports, the actuator moves to the second position.

7. The transmission device as claimed in claim 6, wherein the actuator comprises a cylindrical region having a projection extending substantially around the periphery of the cylindrical region, and the fluid channel comprises an annular fluid channel.

8. The transmission device as claimed in claim 7, wherein the projection forms a seal with a wall of the fluid channel.

9. The transmission device as claimed in claim 1, wherein the body is in the form of a housing that houses the input member and the gear assembly.

10. The transmission device as claimed in claim 1, wherein the input member is configured to be connected to the inner gear.

11. The transmission device as claimed in claim 1, wherein the input member is configured to be connected to an input shaft or the input member includes the input shaft.

12. The transmission device as claimed in claim 1, wherein the input member includes an engagement portion, the engagement portion being configured to engage with the gear assembly to allow the gear assembly to rotate at substantially the same rate as the input member.

13. The transmission device as claimed in claim 12, wherein the engagement portion includes one or more bearing faces that engage with the gear assembly to provide rotation thereto.

14. The transmission device as claimed in claim 13, wherein the one or more bearing faces form at least one tooth.

15. The transmission device as claimed in claim 14, wherein the input member includes a plurality of bearing faces in the form of teeth therearound.

16. The transmission device as claimed in claim 1, wherein the gear assembly includes a selecting member.

17. The transmission device as claimed in claim 16, wherein the selecting member includes one or more releasable contacting portions.

18. The transmission device as claimed in claim 17, wherein in response to the one or more releasable contacting portions being engaged in the first position, the gear assembly is configured to rotate with the input member at substantially the same rate as the input member.

19. The transmission device as claimed in claim 17, wherein the one or more releasable contacting portions include one or more contacting faces configured to engage one or more bearing faces.

20. The transmission device as claimed in claim 19, wherein the one or more contacting faces form at least one tooth or the selecting member includes a plurality of contacting faces in the form of teeth therearound.

21. The transmission device as claimed in claim 16, wherein the selecting member is fixed to the outer gear.

22. A drilling system, the system including:
   a motor providing hydraulic fluid to a transmission device, the transmission device as claimed in claim 1, the transmission device being connected to an auger or to a screw pile.

23. The transmission device as claimed in claim 1, wherein the actuator includes an actuation member.

24. The transmission device as claimed in claim 23, wherein the actuation member is located between the body and a selecting member.

25. The transmission device as claimed in claim 24, wherein the actuation member is configured to engage the selecting member in order to assist in moving the selecting member.

26. The transmission device as claimed in claim 23, wherein the actuation member is substantially cylindrical.

27. The transmission device as claimed in claim 23, wherein the actuation member is in fluid communication with the one or more fluid ports and in response to fluid being directed through the one or more fluid ports in a first direction, the actuation member is located in the first position and in response to fluid being directed through the one or more fluid ports in a second direction, the actuation member moves in a direction substantially parallel to the axis of rotation to the second position.

28. The transmission device as claimed in claim 23, wherein as the actuation member moves in a direction substantially parallel to the axis of rotation to the second position, the actuation member moves a selecting member to the second position, and preferably, the selecting member moves substantially parallel to the axis of rotation to the second position.

29. The transmission device as claimed in claim 23, wherein the gear assembly includes a selecting member, and wherein the selecting member is rotatably connected to the actuation member.

30. The transmission device as claimed in claim 1, wherein the fluid is in the form of hydraulic fluid and the hydraulic fluid is supplied from a motor or from a hydraulic fluid supply that also drives the motor.

31. The transmission device as claimed in claim 1, wherein the inner gear is in the form of a sun gear, the one or more intermediate gears are in the form of a planetary gear and the outer gear is a ring gear.

32. The transmission device as claimed in claim 1, wherein the one or more intermediate gears are connected with a carrier member.

33. The transmission device as claimed in claim 32, wherein the output member is connected to the carrier member.

34. The transmission device as claimed in claim 1, wherein the transmission device is driven by a hydraulic motor, the hydraulic motor being driven by a supply of pressurised hydraulic fluid; and further including a first fluid port and a second fluid port being in fluid communication with a fluid channel in the body, the actuator having a portion extending into the fluid channel, whereby when pressurised hydraulic fluid is provided to one of the first fluid port all the second fluid port, the actuator moves to the first position and when pressurised hydraulic fluid is provided to the other of the first fluid portal the second fluid port, the actuator moves to the second position.

35. The transmission device as claimed in claim 34, wherein the pressurised hydraulic fluid supplied to the first fluid port or the second fluid port is provided from the supply of hydraulic fluid that is used to drive the hydraulic motor.

36. A transmission device comprising:
   a body assisting to support components including:
      an input member extending at least part way along the body, the input member having an axis of rotation;
   a gear assembly that is connected to the input member, the gear assembly having:

an inner gear;
one or more intermediate ears engaged with the inner gear; and
an outer gear engaged with the one or more intermediate gears;
wherein in a first position the gear assembly is configured with the input member to rotate at substantially the same rate as the input member and axial movement of at least one component to a second position, in a direction substantially parallel to the axis of rotation, allows the gear assembly to provide to an output member a different output rate relative to the input member; and
an actuator is movable between a first position at which the near assembly can move to its first position, and a second position at which the near assembly can move to its second position, said actuator being movable under the influence of hydraulic pressure,
wherein the body is configured to support a further input member, a further gear assembly and a further output member or the body is configured to be connected to a further transmission.

37. A drilling system, the system including: a motor providing hydraulic fluid to a transmission device, the transmission device as claimed in claim 36, the transmission device being connected to an auger or a screw pile.

38. A transmission device comprising:
a body assisting to support components including:
an input member extending at least part way along the body, the input member having an axis of rotation;
a gear assembly that is connected to the input member, the gear assembly having:
an inner gear;
one or more intermediate gears engaged with the inner gear; and
an outer gear engaged with the one or more intermediate gears;
wherein in a first position the year assembly is configured with the input member to rotate at substantially the same rate as the input member and axial movement of at least one component to a second position, in a direction substantially parallel to the axis of rotation, allows the rear assembly to provide to an output member a different output rate relative to the input member; and
an actuator is movable between a first position at which the gear assembly can move to its first position, and a second position at which the gear assembly can move to its second position, said actuator being movable under the influence of hydraulic pressure;
wherein the transmission device further includes a control system;
wherein the control system comprises at least one sensor for sensing hydraulic pressure in an hydraulic motor, the control system determining if hydraulic pressure is increasing and, if the control system determines that the rate of increase of the hydraulic pressure has slowed to below a predetermined value or to zero, the control system determining or recording a pressure value at which the rate of increase of the hydraulic pressure slowed to below the predetermined value or to zero, the control system then calculating a gear change hydraulic pressure from the determined or recorded pressure value, the key change hydraulic pressure representing a pressure at which the control system sends a signal to cause the transmission device to change from a higher output speed to a lower output speed.

39. The transmission device as claimed in claim 38, wherein the control system further includes one or more valves for controlling flow of hydraulic fluid to the first port and to the second port, and when the gear assembly is in the first and the control system determines that the gear change hydraulic pressure has been reached, the control system sends a control signal to the one or more valves such that hydraulic fluid supply changes from the first fluid port to the second fluid ports so that the actuator moves to the second position.

40. The transmission device as claimed in claim 38, wherein the one or more valves comprise one or more solenoids.

41. The transmission device as claimed in claim 38, wherein when determining the gear change hydraulic pressure, the control system is also be provided with a minimum pressure value at which the gear change hydraulic pressure should be set and a maximum pressure value at which the gear change hydraulic pressure should be set, and if the determined gear change hydraulic pressure falls below the minimum pressure value, the control system sets the gear change hydraulic pressure to the minimum pressure value, and if the determined gear change hydraulic pressure falls above the maximum pressure value, the control system sets the gear change hydraulic pressure to the maximum value.

42. The transmission device as claimed in claim 38, wherein in order to change the transmission device from a lower output speed to a higher output speed, the control system has a minimum operating hydraulic pressure, and if the pressure that is sensed in the hydraulic motor is less than the minimum operating hydraulic pressure, the control system will send a control signal to change the transmission from a low speed output to a high speed output.

43. A drilling system, the system including: a motor providing hydraulic fluid to a transmission device, the transmission device as claimed in claim 38, the transmission device being connected to an auger or a screw pile.

44. A transmission device comprising:
a body assisting to support components including:
an input member extending at least part way along the body, the input member having an axis of rotation;
a gear assembly that is connected to the input member, the gear assembly having:
an inner gear;
one or more intermediate gears engaged with the inner gear; and
an outer gear engaged with the one or more intermediate gears;
wherein in a first position the gear assembly is configured with the input member to rotate at substantially the same rate as the input member and axial movement of at least one component to a second position, in a direction substantially parallel to the axis of rotation, allows the gear assembly to provide to an output member a different output rate relative to the input member; and
an actuator is movable between a first position at which the gear assembly cal move to its first position, and a second position at which the gear assembly can move to its second position, said actuator being movable under the influence of hydraulic
wherein the gear assembly includes a selecting member; and
wherein the outer gear includes an outer surface that is fixed to the selecting member.

45. A drilling system, the system including: a motor providing hydraulic fluid to a transmission device, the transmission device as claimed in claim 44, the transmission device being connected to an auger or a screw pile.

* * * * *